United States Patent
Kato et al.

(10) Patent No.: US 11,362,864 B2
(45) Date of Patent: Jun. 14, 2022

(54) COMMUNICATION CONTROL SYSTEM, COMMUNICATION CONTROL DEVICE AND COMMUNICATION CONTROL METHOD

(71) Applicant: Yamaha Corporation, Hamamatsu (JP)

(72) Inventors: Hiroaki Kato, Kikugawa (JP); Yoshimitsu Nishihara, Kakegawa (JP)

(73) Assignee: Yamaha Corporation, Hamamatsu (JP)

( * ) Notice: Subject to any disclaimer, the term of this patent is extended or adjusted under 35 U.S.C. 154(b) by 63 days.

(21) Appl. No.: 16/700,150

(22) Filed: Dec. 2, 2019

(65) Prior Publication Data
US 2020/0106642 A1     Apr. 2, 2020

Related U.S. Application Data

(63) Continuation of application No. PCT/JP2017/020882, filed on Jun. 5, 2017.

(51) Int. Cl.
*H04L 12/46* (2006.01)

(52) U.S. Cl.
CPC ...... *H04L 12/4641* (2013.01); *H04L 12/4625* (2013.01); *H04L 12/4633* (2013.01)

(58) Field of Classification Search
CPC ............ H04L 12/2812; H04L 12/4625; H04L 12/4633; H04L 12/4641
See application file for complete search history.

(56) References Cited

U.S. PATENT DOCUMENTS

| | | | | |
|---|---|---|---|---|
| 7,698,396 B2 * | 4/2010 | Aoyagi | ............... | H04L 41/0213 709/223 |
| 2004/0037295 A1 | 2/2004 | Tanaka et al. | | |

(Continued)

FOREIGN PATENT DOCUMENTS

| | | |
|---|---|---|
| JP | 2003-289313 A | 10/2003 |
| JP | 2006-18852 A | 1/2006 |

(Continued)

OTHER PUBLICATIONS

English translation of (Japanese-language Written Opinion (PCT/ISA/237) previously filed on Dec. 2, 2019) issued in PCT Application No. PCT/JP2017/020882 dated Jul. 11, 2017 (five (5) pages).
International Search Report (PCT/ISA/210) issued in PCT Application No. PCT/JP2017/020882 dated Jul. 11, 2017 with English translation (two (2) pages).
Japanese-language Written Opinion (PCT/ISA/237) issued in PCT Application No. PCT/JP2017/020882 dated Jul. 11, 2017 (four (4) pages).

(Continued)

*Primary Examiner* — Mansour Oveissi
(74) *Attorney, Agent, or Firm* — Crowell & Moring LLP

(57) ABSTRACT

A communication system includes a first local area network (LAN), a first router that is operatively coupled to the first LAN, a second local area network (LAN), a second router that is operatively coupled to the second LAN, and a communication network that facilitates communication between the first router and the second router. The first router includes a communication control device having at least one processor that transmits first information indicating a connection relation of a first communication relay device to the first communication relay device connected via the Internet. The processor also receives the first information from the first communication relay device. The processor also causes connection information in accordance with the received information indicating the connection relation of the first communication relay device to be displayed on a display unit.

17 Claims, 7 Drawing Sheets

(56) References Cited

U.S. PATENT DOCUMENTS

| | | | |
|---|---|---|---|
| 2013/0242804 A1* | 9/2013 | Yabusaki | H04L 45/04 370/255 |
| 2014/0010109 A1 | 1/2014 | Himura et al. | |
| 2017/0085433 A1 | 3/2017 | Kato et al. | |
| 2017/0104642 A1 | 4/2017 | Miura et al. | |
| 2017/0374114 A1* | 12/2017 | Feldman | H04W 12/033 |

FOREIGN PATENT DOCUMENTS

| | | |
|---|---|---|
| JP | 2009-165028 A | 7/2009 |
| JP | 2013-175999 A | 9/2013 |
| JP | 2015-228629 A | 12/2015 |
| JP | 2017-73666 A | 4/2017 |

OTHER PUBLICATIONS

Japanese-language Office Action issued in Japanese Application No. 2019-523229 dated Sep. 29, 2020 with English translation (eight (8) pages).
English translation of Japanese Office Action issued in Japanese Application No. 2019-523229 dated May 18, 2021 (three (3) pages).
English translation of Japanese Office Action issued in Japanese Application No. 2019-523229 dated May 26, 2021 (three (3) pages).
English translation of Chinese-language Office Action issued in Chinese Application No. 201780091338.4 dated Dec. 29, 2021 with English translation (nine (9) pages).
English-translation of Japanese Office Action issued in Japanese Application No. 2019-523229 dated Mar. 15, 2022 (22 pages).

* cited by examiner

FIG. 4

MAC address table of the switch incorporated in the router 12

| MAC address | Port number |
|---|---|
| ... | 1 |
| mac-g, mac-h, mac-i, mac-j | 2 |
| mac-f | 3 |

MAC address table of Switch 13a

| MAC address | Port number |
|---|---|
| mac-r2 | 1 |
| mac-i, mac-j | 2 |
| mac-h | 4 |

MAC address table of Switch 13b

| MAC address | Port number |
|---|---|
| mac-r2, mac-g | 1 |
| mac-j | 2 |

MAC address table of the switch incorporated in the router 2

MAC address table of Switch 3a

MAC address table of Switch 3b

COMMUNICATION CONTROL SYSTEM, COMMUNICATION CONTROL DEVICE AND COMMUNICATION CONTROL METHOD

CROSS REFERENCE TO RELATED APPLICATIONS

This application is a U.S. continuation application filed under 35 U.S.C. § 111(a), of International Application No. PCT/JP2017/020882 filed on Jun. 5, 2017, the disclosures of which are incorporated by reference.

FIELD

The embodiments of the present invention relate to a communication control system, a communication control device, a communication control method.

BACKGROUND

A conventional router regularly collects the storage contents in a MAC address table and MAC addresses from switching hubs included in a LAN (Local Area Network) connected via the router to a communication network such as the Internet. In a technique, the router is caused to perform a process of analyzing the data collected from each switching hub and generating network topology data representing a network topology of the LAN as a tree structure. This technology allows the network topology of the LAN to be easily grasped.

SUMMARY

According to one embodiment of the present invention, a communication control device is provided which includes a transmitting unit which transmits a signal for making an instruction of transmitting information indicating a connection relation of the first communication relay device to the first communication relay device connected via the Internet, a receiving unit which receives the information indicating the connection relation of the first communication relay device from the first communication relay device, and a display control unit which causes connection information in accordance with the information indicating the connection relation of the first communication relay device received by the receiving unit to be displayed on a display unit.

According to the embodiments of the present invention, a communication control device which causes an image representing a connection relation of a communication relay device ahead via a communication network such as the Internet to be displayed on a display unit.

BRIEF DESCRIPTION OF THE DRAWINGS

FIG. 4 is a diagram of examples of a MAC address table of a switch incorporated in a router 12 and MAC address tables of other switches, according to one embodiment of the present invention;

DESCRIPTION OF EMBODIMENTS

Figure 1:
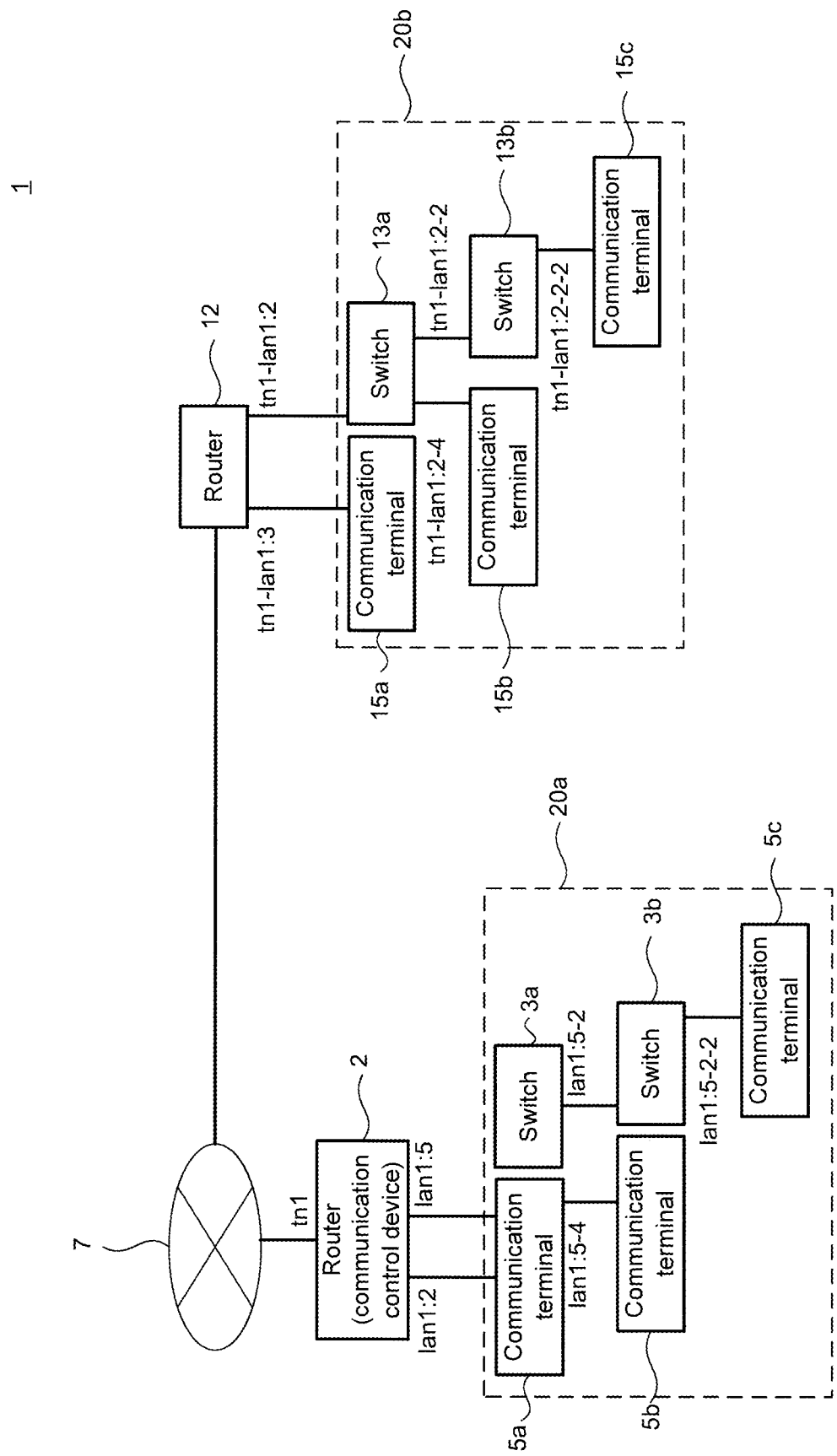
FIG. 1 is a block diagram of the structure of a communication system according to one embodiment of the present invention.

In the following, one embodiment of the present invention is described in detail with reference to the drawings. The following embodiments are each merely an example of embodiments of the present invention, and the present invention is not limited by these embodiments. In the drawings referred to in the embodiments, the same portions or portions having similar functions are provided with the same reference character or a similar reference character (reference character with a suffix such as a, b, or the like added to a numeral), and may not be repeatedly described.

Between locations such as between a head office and a branch office, each different LAN is constructed via the Internet or the like. In the technique disclosed in Japanese Unexamined Patent Application Publication No. 2015-228629, the router can perform a process of generating network topology data representing a network topology of the LAN under that router in a tree structure. However, in the technique disclosed in Japanese Unexamined Patent Application Publication No. 2015-228629, the router cannot perform a process of generating network topology data representing a network topology of the LAN under that router and a router ahead via the Internet in a tree structure. Thus, technique disclosed in Japanese Unexamined Patent Application Publication No. 2015-228629 has a problem in which a specific router at a specific location cannot collectively grasp connection relations among switches, wireless access points, communication terminals and so forth connected to a router at a location different from the specific location.

The embodiments of the present invention solve the problem associated with the conventional technology as described above. An object of the embodiments of the present invention is to provide a communication control device which causes an image representing a connection relation of a communication relay device ahead via a communication network such as the Internet to be displayed on a display unit.

Embodiments

[Structure of Communication System]

FIG. 1 is a block diagram of the structure of a communication system according to one embodiment of the present invention. A communication system 1 includes a router (communication control device) 2, a LAN 20a, a router 12, and a LAN 20b. The LAN 20a includes two switches 3 (a switch 3a and a switch 3b) and three communication terminals 5 (a communication terminal 5a, a communication terminal 5b, and a communication terminal 5c) connected to each switch and the router 2. The switch 3a is connected to the router 2. To this switch 3a, the switch 3b and the communication terminal 5b are connected. To the switch 3b, the communication terminal 5c is connected.

The LAN 20b includes two switches 13 (a switch 13a and a switch 13b) and three communication terminals 15 (a communication terminal 15a, a communication terminal 15b, and a communication terminal 15c) connected to each switch and the router 12. The switch 13a is connected to the router 12. To this switch 13a, the switch 13b and the communication terminal 15b are to the switch 13b, the communication terminal 15c is connected. Here, the 3a and the switch 3b are collectively referred to simply as the "switch 3" if not required to be distinguished therebetween. Similarly, the communication 5a, the communication terminal 5b, and the communication terminal 5c are collectively referred to simply as the "communication terminal 5" if not required to be distinguished thereamong. The switch 13a and the switch 13b are collectively referred to simply as the "switch 13" if not required to be distinguished therebetween. The communication terminal 15a, the communication terminal and the communication terminal 15c are collectively referred to simply as the "communication terminal 15" if not required to be distinguished thereamong. The communication terminal 5 and the communication terminal 15 are, for example, communicable devices such as smartphones or personal computers.

The router 2 and the router 12 are connected to each other via a communication network 7 such as the Internet or a WAN (Wide Area Network). The router 2 and the router 12 are connected to each other via, in this example, a VPN (Virtual Private Network) connection. That is, a tunnel is established on the Internet. In this example, a VPN connection in Layer 2 (data link layer) (L2VPN). Here, the router 12 and the switch 13 may be each referred to as a communication relay device (first communication relay device) connected by the VPN via the Internet.

As will be described in detail below, the router 2 transmits, to the first communication relay device (the router 12 and the switch 13), a signal for making an instruction of transmitting information indicating a connection relation of the communication relay device. Each first communication relay device receiving signal transmits the information to the router 2. Here, it can be said that the 2 controls the first communication relay device, and the router 2 can thus be referred to as a "master" and the first communication relay device can be referred to as a "slave". In this example, a router serving as a slave is one router 12. number of routers serving as slaves for the router 2 is not limited to one but may two or more.

[Hardware Structure of Communication Control Device]

Figure 2:
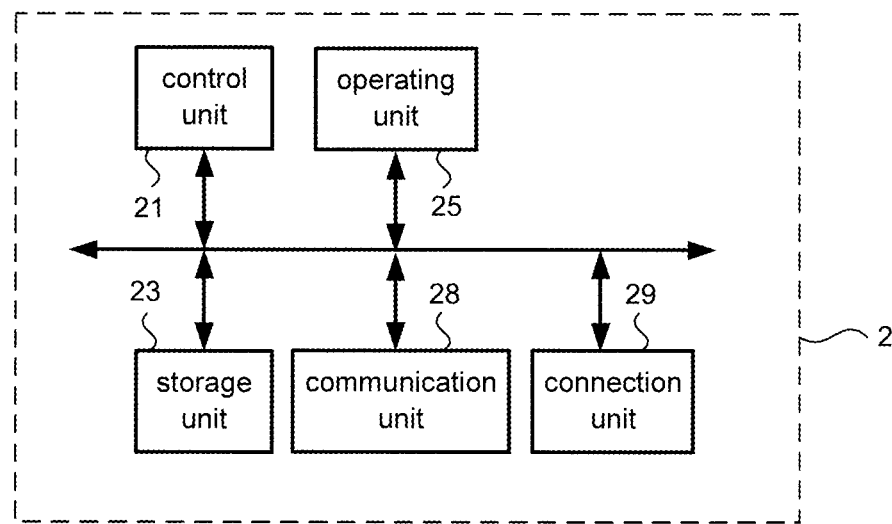
FIG. 2 is a block diagram of the structure of a communication control device according to one embodiment of the present invention.

Next, the router (communication control device) 2 is described by using FIG. 2. FIG. 2 is a block diagram of the structure of the communication control device according to one embodiment of the present invention. As depicted in FIG. 2, the router 2 includes a control unit 21, a storage unit 23, an operating unit 25, a communication unit 28, and a connection unit 29. These structures are connected to one another via a bus.

The control unit 21 includes an arithmetic processing circuit such as a CPU. The control unit 21 executes by the CPU a program stored in the storage unit 23, thereby achieving a function for performing a display control process and so forth, which will be described further below. The structure for achieving this function is not limited to be partially and entirely achieved by software by executing a program, but may be achieved by hardware.

The storage unit 23 is a storage device such as a non-volatile memory or hard disk. The storage unit 23 includes a storage area for storing an application program for achieving various functions such as the above-described program. The program can be any as long as it can be executed by the computer. The program may be provided as being stored in a computer-readable recording medium such as a magnetic recording medium, optical recording medium, magneto-optical recording medium, or semiconductor memory. In this case, the router 2 may include a device which reads the recording medium. Also, the program may be downloaded via a network.

The operating unit 25 is a device such as an operation button, which outputs a signal in response to an operation inputted by a user to the control unit 21. The communication unit 28 communicates with an external device connected to the network based on the control of the control unit 21 for transmission and reception of information.

The connection unit 29 is an interface connected to an external device for transmission and reception of information. In this example, the connection unit 29 and the external device are connected in a wired manner, and the connection unit 29 is a connector to which a cable or the like is connected. In the above, the hardware structure of the router 2 has been described. The communication terminal 5 such as a PC has a display unit. The display unit is a display device such as a liquid-crystal display or an organic EL display, which displays a screen based on the control by the control unit 21. In a display method, a screen may be displayed on a Web GUI by using a Web browser. To the communication terminal 5 such as a PC, devices such as a keyboard, mouse, and so forth may be connected, and a signal in response to an operation inputted by the user may be outputted to the control unit 21. In this example, the communication terminal 5 is connected in a wired manner, but may be wirelessly connected. Also, the display unit may be provided to the router 2.

[Software Structure of Communication Control Device]

Figure 3:
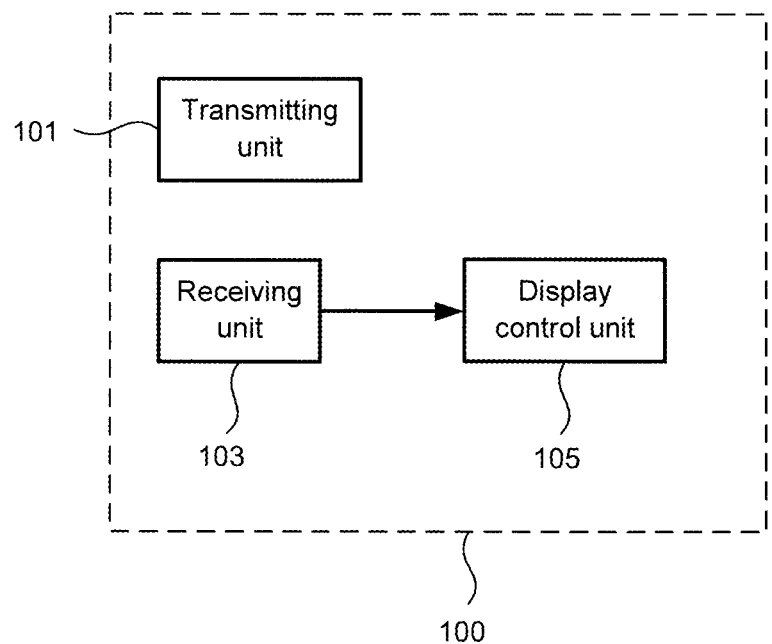
FIG. 3 is a block diagram of a functional structure achieved by a control unit of the communication control device according to one embodiment of the present invention.

Next, the software structure of the router 2 is described by using FIG. 3. FIG. 3 is a block diagram of a functional structure achieved by the control unit of the communication control device according to one embodiment of the present invention. Here, a structure is described which is achieved as a function (display control function 100) for performing a display control process, with the above-described program executed by the control unit 21. The display control function 100 includes a transmitting unit 101, a receiving unit 103, and a display control unit 105.

The transmitting unit 101 transmits a signal for making an instruction of transmitting information indicating a connection relation of that first communication relay device to the first communication relay device (the router 12 and the switch 13) connected by the VPN via the Internet.

The transmitting unit 101 and the receiving unit 103 have a function of pass-through of the above-described instruction signal and its corresponding response signal via the VPN. VPNs can be classified into a VPN at the Layer 2 (data link layer) level and a VPN at Layer 3 (network layer) level, but any type of VPN can be used herein. This allows the transmitting unit 101 to transmit a signal for making an instruction for transmitting information indicating a connection relation of the first communication relay device to the first communication relay device.

The information indicating a connection relation of the first communication relay device is information indicating a connection relation of the router 12 and information indicating a connection relation of the switch 13, and is MAC address information recognized by each device. The information indicating the connection relation of the router 12 is, for example, a MAC address table of the router 12, that is, a MAC address table of a switch incorporated in the router 12. Also, the information indicating the connection relation of the switch 13 is, specifically, a MAC address table of the switch 13. Note that the MAC address information recognized by each device is not limited to the MAC address table of a switch. The router 12 does not have a switch incorporated therein, an ARP table or Neighbor Cache table is referred to.

Here, by using FIG. 4, the MAC address table of the switch incorporated in the router 12 and the MAC address table in the switch 13 are described. FIG. 4 is a diagram of examples of the MAC address table of the switch incorporated in the router 12 and MAC address tables of other switches, according to one embodiment of the present invention. Port numbers 153a, 153b, and 153c depicted in FIG. 4 correspond to port numbers in FIG. 1, FIG. 6, and FIG. 7. As depicted in the MAC address table of the switch incorporated in the router 12 in FIG. 4, it can be found that communication relay devices and communication terminals with MAC addresses "mac-g", "mac-h", "mac-i", and "mac-j" are associated with a port number 2 (#2). Also, it can be found that a communication relay device or communication terminal with a MAC address "mac-f" is associated with a port number 3 (#3). However, the location where the communication relay device or communication terminal provided with a MAC address is actually present cannot be identified only by the MAC address table. While the MAC address is normally represented in hexadecimal with twelve digits, it is represented herein as, for example, "mac-x", for convenience of description.

Figure 5:
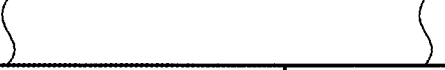
FIG. 5 is a diagram of examples of a MAC address table of a switch incorporated in a router 2 and MAC address tables of other switches, according to one embodiment of the present invention.
Figure 5:
Figure 5:

Description is now made by referring back to FIG. 3 again. The transmitting unit 101 may transmit to the switch 3 (second communication relay device) in the LAN a signal for making an instruction of transmitting information indicating the connection relation of the switch 3. The information indicating the connection relation of the switch 3 is, for example, the MAC address table of the switch 3. Here, by using FIG. 5, the MAC address table of the switch in the router 2 and the MAC address table of the switch 3 are described. FIG. 5 a diagram of examples of the MAC address table of the switch incorporated in the router 2 and MAC address tables of other switches, according to one embodiment of the present invention. Port numbers 153d, 153e, and 153f depicted in FIG. 5 correspond to port numbers in FIG. 1, FIG. 6, and FIG. 7. As depicted in the address table of the switch incorporated in the router 2 in FIG. 5, a terminal with a MAC address "mac-a" is associated with a port number 2 of the router 2. Also, the communication relay device or communication terminal with MAC addresses "mac-b", "mac-c", "mac-d", and "mac-e" are associated with a number 5 (#5) of the router 2.

Description is now made by referring back to FIG. 3 again. The transmitting unit 101 may transmit to the router 12 and the switch 13 (both are hereinafter collectively represented as a "first communication relay device") and the switch 3 (second communication relay device) in the LAN a signal for making an instruction of transmitting information about specifications and an image of each communication relay device. Here, the information about the specifications of each communication relay device includes model names, firmware information; equipped functions; the number of ports; and so forth of the router 12, the switch 13, and the switch 3.

The receiving unit 103 receives from the router 12 and the switch 13 (first communication relay device) information indicating a connection relation of the first communication relay device. The receiving unit 103 receives information indicating a connection relation of the second communication relay device from the switch 3 (second communication relay device) in the LAN. The receiving unit 103 may receive information about specifications and an image of each communication relay device from the router 12, the switch 13, and the switch 3.

The display control unit 105 causes connection information in accordance with the information indicating the connection relation of the first communication relay device to be displayed on the display unit. In this example, based on the information indicating the connection relation of the first communication relay device, the display control unit 105 causes an image representing the connection relation of the router 12 and the switch 13 to be displayed on the display unit. Specifically, the display control unit 105 infers and constructs a network topology from the MAC address tables of the router 12 and the switch 13 by, for example, precluding redundant MAC addresses. For example, with reference to the MAC address tables depicted in FIG. 4, a MAC address "mac-f" is stored only in the MAC address table of the switch incorporated in the router 12. Thus, the MAC address "mac-f" is identified as being directly connected to the router 12.

Also, with reference to the MAC address table of the switch incorporated in the router 12, the MAC addresses "mac-g", "mac-h", "mac-i", and "mac-j" are stored in the port number 2. The MAC addresses "mac-i" and "mac-j" are stored in the port number 2 of the MAC address table of the switch 13a, the MAC address "mac-h" is stored in the port number 4, and a MAC address "mac-r2" is stored in the port number 1. Of four MAC addresses "mac-g", "mac-h", "mac-i", and "mac-j" corresponding to the port number 2 of the router 12, three MAC addresses "mac-h", "mac-i", and "mac-j" are included in the MAC address table of the switch 13a. That is, it can be found that the communication relay devices or communication terminals with the three MAC addresses "mac-h", "mac-i", and "mac-j" are not directly connected to the port number 2 of the router 12. Thus, if these three MAC addresses not directly connected to the router 12 are excluded from four MAC addresses "mac-g", "mac-h", "mac-i", and "mac-j" corresponding to the port number 2 of the router 12, "mac-h" is left. Therefore, it can be identified that the communication relay device (switch 13a) with the MAC address "mac-h" is directly connected to the port number 2 of the router 12. With a similar manner, a network topology can be inferred.

Figure 6:
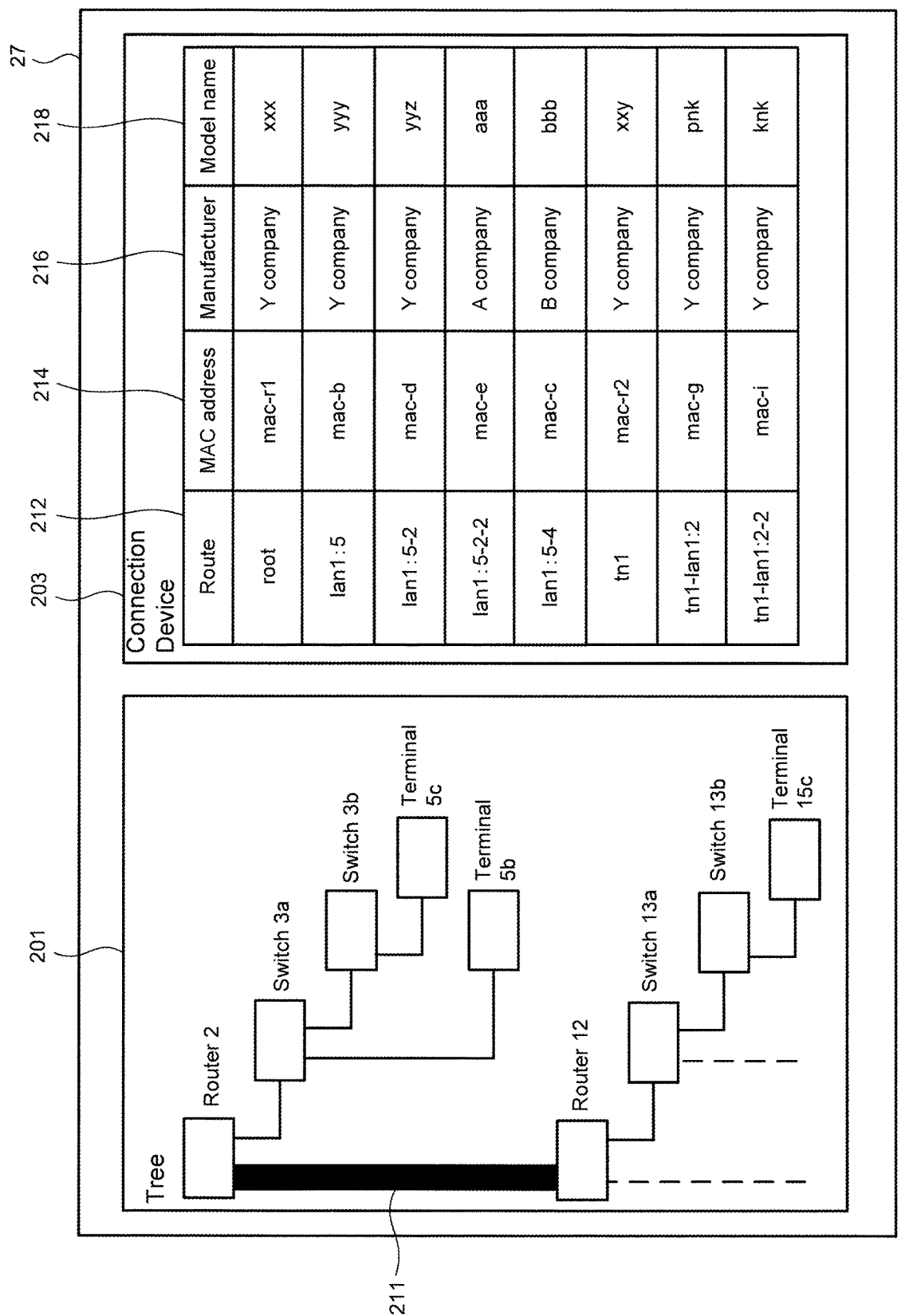
FIG. 6 is a diagram of an example of an image caused to be displayed by display control unit of the communication control device according to one embodiment of the present invention.

Once the network topology is identified, the display control unit 105 an image representing connection relations of the router 12 and the switch 13 to displayed on the display unit. Here, by using FIG. 6, an example of the image to be displayed on the display unit is described. FIG. 6 is a diagram of an example the image caused to be displayed by the display control unit of the communication control device according to one embodiment of the present invention. On the display unit, a tree 201 and connection device information 203 are displayed.

When the receiving unit 103 receives the information indicating the connection relations of the router 12 and the switch 13, the display control unit 105 causes an image representing the connection relations of the router 12 and the switch 13 to be displayed on the display unit based on the information indicating the connection relation of the router 12 and the switch 13. Specifically, displayed in FIG. 6 are the router 12, the switch 13a connected to the port number 2 of the router 12, a communication terminal (not depicted) connected to the port number 3 of the router 12, the switch 13b connected to the port number 2 of switch 13a, a communication terminal (not depicted) connected to the port number 4 of the switch 13a, and the communication terminal 15c connected to the port number 2 of the switch 13b.

The display control unit 105 may further cause an image representing the connection relation of the router 2 and the switch 3 to be displayed on the display unit based on the information indicating the connection relation of the switch 3 in the LAN received by the receiving unit 103. Specifically, displayed in FIG. 6 are the switch 3a connected to the port number 5 of the router 2, a communication terminal (not depicted) connected to the port number 2 of the router 2, the switch 3b connected to the port number 2 of the switch 3a, the communication terminal 5b connected to the port number 4 of the switch 3a, and the communication terminal 5c connected to the port number 2 of the switch 3b.

The display control unit 105 may cause the information and an image about the specifications of the router 12, the switch 13, and the switch 3 received by the receiving unit 103 to be displayed on the display unit. For example, as the connection device information 203, the display control unit 105 may cause a route 212, a MAC address 214, a manufacturer 216, a model name 218 to be displayed in association with one another on the display unit. Here, "root" in the route 212 represents the router 2, and "mac-r1" in the MAC address 214 represents the address of the router 2. "Y company" in the manufacturer 216 represents the manufacturer name of the router 2, and "xxx" in the model name 218 represents the model name of the router 2. Since the router 2 is a master, it may not be displayed on the connection device information 203.

The route 212 is route information indicating a route from the router 2. "lan1:5" in the route 212 means that the LAN of the router 2 has a name "LAN1" and is connected to the port number 5. That is, it means that the switch 3a has a MAC address "mac-b" and is connected to the port number 5 of "LAN1" of the router 2. On the other hand, "tn1" in "tn1-lan1:3" in the route 212 means the first place in a tunnel. "lan1" in "tn1-lan1:3" means a LAN having a name "LAN1" of the router 12 in the tunnel. While "tn" and "lan" are represented by using lowercase letters, the head letter may be represented by an uppercase letter, or all of the letters may be represented by uppercase letters. Any representation method in which the meanings of the respective representations are distinguishable can be taken.

The connection device information 203 is not limited to four pieces of information depicted in FIG. 6, but may include, for example, a model icon. Also, the model icon may be stored in advance in the storage unit 23 of the router 2 or external storage device in association with the model name. When the receiving unit 103 receives the model names of the router 12, the switch 3, the switch 13, communication terminal 5, and the communication terminal 15, the display control unit 105 may refer to the storage unit 23 or the external storage device and cause model icons corresponding to the model names to be displayed on the display as the connection device information 203.

The display control unit 105 may cause the tunnel in the VPN and the connection of its own device (router 2) and the switch 3 in the LAN to be displayed on the display unit as being distinguished from each other. Specifically, as depicted in FIG. 6, as for the tunnel in the VPN, an icon 211 is displayed in a bold manner, and the connection between the router 2 and the switch 3 is displayed by using a fine line.

However, the image is not limited to the image depicted in FIG. 6, and any image in which both are distinguishable can be used.

Figure 7:
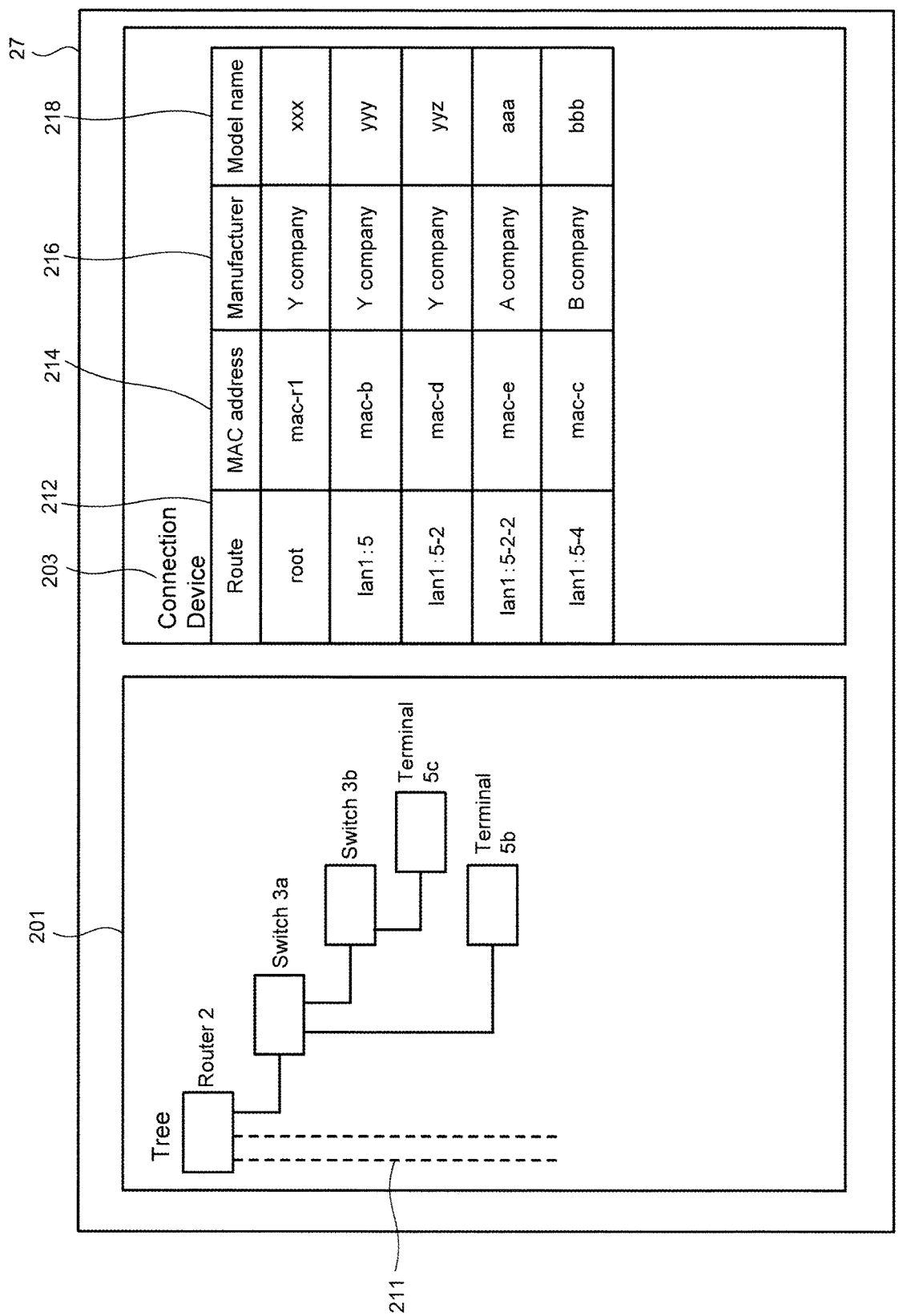
FIG. 7 is a diagram of another example of the image caused to be displayed by the display control unit of the communication control device according to one embodiment of the present invention.

The display control unit 105 may cause a case in which the tunnel in the VPN has been established and a case in which the tunnel in the VPN has been cut off to be displayed on the display unit so that these cases are distinguishable. Specifically, the display control unit 105 may cause the icon 211 to be displayed in a bold manner if the tunnel has been established, as depicted in FIG. 6. If the tunnel has been cut off, the display control unit 105 may cause the icon 211 to be displayed by using a broken line, as depicted in FIG. 7. However, the image is not limited to the images depicted in FIG. 6 and FIG. 7, and any image in which both cases are distinguishable can be used. The router 2 detects whether the tunnel has been cut off by using a keep-alive. In the above, the software structure of the router 2 has been described.

According to the present embodiment, the router 2 receives, from the router 12 and switch 13 connected by the VPN via the Internet, information indicating a connection relation of that router 12 and information indicating a connection relation of the switch 13. Based on these pieces of information, an image representing the connection relation of the router 12 and an image representing the connection relation of the switch 13 can be caused to be displayed on the display unit. Thus, the specific router 2 at the specific location can collectively grasp the connection relations of the router 12 and the switch 13 a location different from that specific location. This allows an administrator to collectively grasp and manage, at a specific location, the connection relations of routers and switches at all locations constructing the VPN via the Internet with the router 2.

Also, in the present embodiment, the receiving unit 103 can receive the information and the image about the specifications of each communication relay device from the router 12, the switch 13, and the switch 3. The display control unit 105 can then cause the information and the image about the specifications of each communication relay device to be displayed on the display unit. Thus, it is not required for the router 2 side to previously incorporate information about slaves such as the router 12, the switch 13, and the switch 3.

[Operation Flow]

Figure 8:
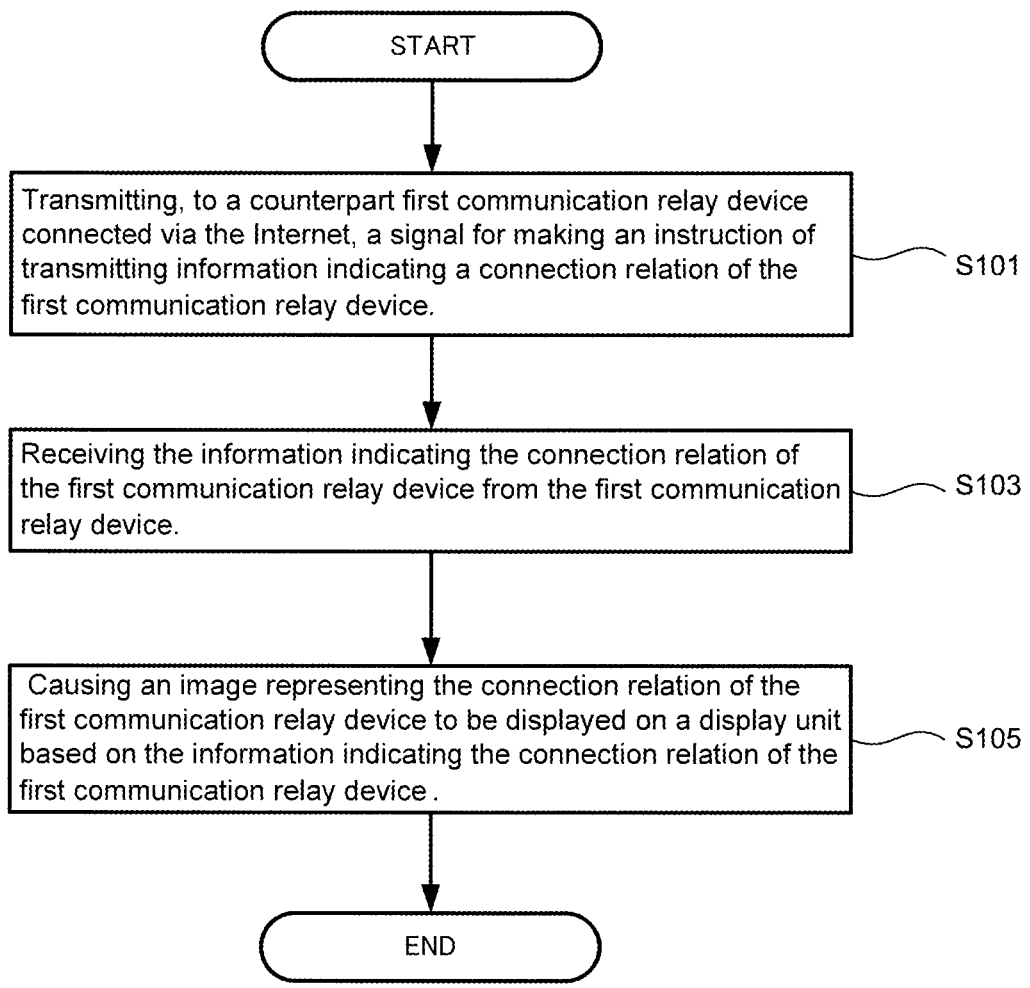
FIG. 8 is a diagram of one example of an operation flow of the communication control device according to one embodiment of the present invention.

Next, by using FIG. 8, an operation flow of the router 2 is described. FIG. 8 is a diagram of one example of the operation flow of the communication control device according to one embodiment of the present invention.

First, the transmitting unit 101 transmits, to the router 12 and switch 13 (first communication relay device) connected by the VPN via the Internet, a signal for making an instruction of transmitting information indicating a connection relation of the first communication relay device (step S101).

Next, the receiving unit 103 receives from the first communication relay device the information indicating the connection relation of the first relay device (step S103). Then, based on the information indicating the connection relation of the first communication relay device, the display control unit 105 causes an image representing the connection relation of the router 12 and switch 13 to be displayed on the display unit (step S105).

In the above, one example of the operation flow of the router 2 has been described. However, the above description is merely an example, and is not limited thereby. Also, the transmitting unit 101 may transmit to the switch 3 in the LAN a signal for making an instruction of transmitting information indicating the connection relation of the switch 3. The receiving unit 103 receives the information corresponding to the signal transmitted from the transmitting unit 101. The display control unit 105 causes an image in accordance with the information received by the receiving unit 103 to be displayed on the display unit.

In the above-described embodiment, description has been made on the premise that the communication control device is a router. However, a switch may have the function of the communication control device. Also, in this modification example, the same effects as those of the above embodiment can be achieved.

In the above-described embodiment, as an example for the display control unit 105 causing the connection information in accordance with the information indicating the connection relation of the first communication relay device to be displayed on the display unit, an image is used, but text may be used. In this case, the connection relation of the first communication relay device is represented by text. Also in this modification example, the same effects as those of the above embodiment can be achieved.

The present invention is not limited to the above-described embodiments and can be changed as appropriate in a range not deviating from the gist of the invention.

What is claimed is:

1. A communication system, comprising:
   a first local area network (LAN), the first LAN including a first plurality of communication terminals, and a first plurality of switches operatively coupled to the first plurality of communication terminals;
   a first router that is operatively coupled to the first LAN;
   a second local area network (LAN), the second LAN including a second plurality of communication terminals, and a second plurality of switches operatively coupled to the second plurality of communication terminals;
   a second router that is operatively coupled to the second LAN;
   a communication network that facilitates communication between the first router and the second router, wherein the first router includes a communication control device having at least one processor; and at least one memory device configured to store a program, which, when executed by the at least one processor, causes the at least one processor to:
   transmit a first signal and a third signal, to the second router connected to the first router by a virtual private network via the Internet, the first signal instructing a transmission of a first information indicating a connection relation between the second router, the second plurality of communication terminals and the second plurality of switches composing the second LAN, the third signal instructing a transmission of an information about specifications of the first communication relay device, and the first information being recognized by the second router;
   receive the first information and the information about the specifications of the first communication relay device from the second router;
   cause an information in accordance with the received first information and the received information about the specifications of the first communication relay device to be displayed on a display unit, wherein
   the information about the specifications of the first communication relay device is an information specifying a connection device.

2. A communication control device, comprising:
   at least one processor; and
   at least one memory device configured to store a program, which, when executed by the at least one processor, causes the at least one processor to:
   transmit a first signal and a third signal, to a first communication relay device connected to the communication control device by a virtual private network via the Internet, the first signal instructing a transmission of a first information indicating a connection relation between the first communication relay device, a plurality of communication terminals and a plurality of switches composing a LAN, the third signal instructing a transmission of an information about specifications of the first communication relay device, and the first information being recognized by the first communication relay device;
   receive the first information and the information about the specifications of the first communication relay device from the first communication relay device; and
   cause an information in accordance with the received first information and the received information about the specifications of the first communication relay device to be displayed on a display unit, wherein
   the information about the specifications of the first communication relay device is an information specifying a connection device information.

3. The communication control device according to claim 2, wherein
   the at least one processor is also caused to:
   transmit a second signal, to a second communication relay device in a local area network, the second signal instructing a transmission of second information indicating a connection relation of the second communication relay device;
   receive the second information from the second communication relay device; and
   cause an image representing the received connection relation of the second communication relay device to be displayed on the display unit.

4. The communication control device according to claim 3, wherein
   the at least one processor is also caused to:
   transmit the third signal, to the first communication relay device and the second communication relay device, the third signal instructing a transmission of information and an image about specifications of each of the first and second communication relay devices;
   receive the information and the image about the specifications of each of the first and second communication relay devices; and
   cause the information and the image about the specifications of each of the first and second communication relay devices to be displayed on the display unit, wherein
   the information about the specifications of the first communication relay device includes at least one of a router information, a MAC address information, a manufacturer information, and a model name information.

5. The communication control device according to claim 3, wherein
   the at least one processor is also caused to:
   cause a tunnel in the virtual private network and a connection between the communication control device in the local area network and the second communication relay device to be displayed on the display unit so that the tunnel and the connection are distinguishable.

6. The communication control device according to claim 2, wherein
the at least one processor is also caused to:
cause a case in which a tunnel in the virtual private network has been established and a case in which the tunnel in the virtual private network has been cut off to be displayed on the display unit so that the cases are distinguishable.

7. The communication control device according to claim 2, wherein
the virtual private network is a Layer 2 Virtual Private Network.

8. The communication control device according to claim 2, wherein
the virtual private network is a Layer 3 Virtual Private Network.

9. The communication control device according to claim 8, wherein
the communication control device is a router or a switch.

10. A communication control method to be performed by a communication control device, the method comprising:
transmitting a first signal and a third signal, to a first communication relay device connected to the communication control device by a virtual private network via the Internet, the first signal instructing a transmission of first information indicating a connection relation between the first communication relay device, a plurality of communication terminals and a plurality of switches composing a LAN, the third signal instructing a transmission of an information about specifications of the first communication relay device, and the first information being recognized by the first communication relay device,
receiving the first information and the information about the specifications of the first communication relay device from the first communication relay device; and
causing an information in accordance with the received first information and the information about the specifications of the first communication relay device to be displaced on a display unit, wherein
the information about the specifications of the first communication relay device is an information specifying a connection device information.

11. The communication control method according to claim 10, further comprising:
transmitting, to a second communication relay device in a local area network, a second signal, the second signal instructing a transmission of information indicating a connection relation of the second communication relay device;
receiving, from the second communication relay device, the information indicating the connection relation of the second communication relay device; and
causing an image representing the received connection relation of the second communication relay device to be displayed on the display unit.

12. The communication control method according to claim 11, further comprising:
transmitting a third signal, to the first communication relay device and the second communication relay device, the third signal instructing a transmission of information and an image about specifications of each of the first and second communication relay devices;
receiving the information and the image about the specifications of each of the first and second communication relay devices; and
causing the information and the image about the specifications of each of the first and second communication relay devices to be displayed on the display unit.

13. The communication control method according to claim 11, further comprising:
causing tunnel in the virtual private network and a connection between the communication control device in the local area network and the second communication relay device to be displayed on the display unit so that the tunnel and the connection are distinguishable.

14. The communication control method according to claim 10, further comprising:
causing a case in which a tunnel in the virtual private network has been established and a case in which the tunnel in the virtual private network has been cut off to be displayed on the display unit so that the cases are distinguishable.

15. The communication control method according to claim 10, wherein
the virtual private network is a Layer 2 Virtual Private Network.

16. The communication control method according to claim 10, wherein
the virtual private network is a Layer 3 Virtual Private Network.

17. The communication control method according to claim 16, wherein
the communication control device is a router or a switch.

* * * * *